(12) United States Patent
Tanase

(10) Patent No.: US 11,386,311 B2
(45) Date of Patent: Jul. 12, 2022

(54) RECORDING DEVICE AND RECORDING METHOD USING HALFTONE PROCESSING TECHNIQUE

(71) Applicant: SEIKO EPSON CORPORATION, Tokyo (JP)

(72) Inventor: Kazuyoshi Tanase, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/152,824

(22) Filed: Jan. 20, 2021

(65) Prior Publication Data

US 2021/0224622 A1    Jul. 22, 2021

(30) Foreign Application Priority Data

Jan. 22, 2020  (JP) .............................. JP2020-008189

(51) Int. Cl.
  *G06K 15/02*  (2006.01)
  *H04N 1/405*  (2006.01)
  *B41J 2/135*  (2006.01)

(52) U.S. Cl.
  CPC ..... *G06K 15/1876* (2013.01); *G06K 15/1881* (2013.01); *H04N 1/4051* (2013.01); *B41J 2/135* (2013.01)

(58) Field of Classification Search
  None
  See application file for complete search history.

(56) References Cited

U.S. PATENT DOCUMENTS

2010/0053247 A1*  3/2010  Kakutani ............... B41J 2/2103
                                               347/12
2012/0176632 A1*  7/2012  Katano .................. B41J 2/2114
                                               358/1.9

FOREIGN PATENT DOCUMENTS

JP  2004310355 A  * 11/2004
JP  2007108585 A  *  4/2007
JP  2012-049722 A    3/2012
JP  2017-200003 A   11/2017

* cited by examiner

*Primary Examiner* — Barbara D Reinier
(74) *Attorney, Agent, or Firm* — Global IP Counselors, LLP

(57) ABSTRACT

A recording device includes a head including a first nozzle row that discharges a plurality of drawing inks; and a second nozzle row that discharges an overcoat ink posterior to the drawing inks, and also includes a dot-data generating unit that performs dot-data generating processing including halftone processing using a dither mask. When generating dot data used to perform recording in accordance with a first recording mode in which no nozzle that discharges the overcoat ink is assigned to part of pixels in a recording target region of the recording medium, the first recording mode being a recording mode using the second nozzle row, the dot-data generating unit generates the dot data by using a first overcoat dither mask having a threshold value set so as not to form a dot with the overcoat ink on the part of pixels.

3 Claims, 13 Drawing Sheets

|     | Dr1 |     |     |     |     |     |     |
| --- | --- | --- | --- | --- | --- | --- | --- |
| Dr2 | 0 | 1 | 2 | 3 | 4 | 5 | 6 |
| 0 | 151 | 255 | 1 | 255 | 36 | 255 | 111 |
| 1 | 171 | 21 | 131 | 96 | 161 | 56 | 146 |
| 2 | 41 | 116 | 61 | 186 | 76 | 126 | 16 |
| 3 | 255 | 81 | 255 | 176 | 255 | 31 | 255 |
| 4 | 6 | 101 | 166 | 121 | 91 | 141 | 51 |
| 5 | 66 | 136 | 26 | 86 | 156 | 181 | 106 |
| 6 | 255 | 46 | 255 | 11 | 255 | 171 | 255 |

FIG. 7

RECORDING DEVICE AND RECORDING METHOD USING HALFTONE PROCESSING TECHNIQUE

The present application is based on, and claims priority from JP Application Serial Number 2020-008189, filed on Jan. 22, 2020, the disclosure of which is hereby incorporated by reference herein in its entirety.

BACKGROUND

1. Technical Field

The present disclosure relates to halftone processing technique.

2. Related Art

There is a known printing apparatus in which a printing medium is transported in a transport direction intersecting a primary scanning direction while a printing head having a large number of nozzles that discharge inks is moved in the primary scanning direction to form an image including a large number of dots on the printing medium. In connection with such a printing apparatus, there is a known technique in which an overcoat ink such as a clear ink is superposed on the image. For example, JP-A-2012-49722 discloses a technology that forms an image layer with a black ink on a printing medium and also forms a layer of a clear ink on the image layer to improve the density of black of the image layer.

The technology described in JP-A-2012-49722 is provided on the assumption that dots used to form the layer of clear ink are able to be formed at the entire pixel positions in a region where printing is performed. However, the dots of the clear ink may not be formed at the entire pixel positions in the region where printing is performed, for example, depending on the nozzle configuration of the printing head or the printing method that prioritizes the printing speed or the like. In this case, a dot for a pixel for which a clear ink dot is decided to be formed in halftone processing is thinned out at the time of printing. This leads to occurrence of raster lines where dots of clear ink are not formed along the primary scanning direction, which may cause a result of printing including lines where density varies. Such a disadvantage also occurs in, for example, a case in which an overcoat ink other than the clear ink is superimposed on an image. This applies not only to a printing apparatus but also to other recording devices that discharge liquid droplets on a medium to record dots.

SUMMARY

According to a first aspect of the present disclosure, a recording device is provided. This recording device includes a head including a first nozzle row configured to discharge a plurality of drawing inks, and also including a second nozzle row configured to discharge an overcoat ink posterior to the drawing inks. The recording device also includes a dot-data generating unit configured to perform dot-data generating processing including halftone processing using a dither mask to generate dot data indicating presence or absence of formation of a dot on the printing medium. When generating dot data used to perform recording in accordance with a first recording mode in which no nozzle that discharges the overcoat ink is assigned to part of pixels in a recording target region of the recording medium, the first recording mode being a recording mode using the second nozzle row, the dot-data generating unit is configured to generate the dot data by using a first overcoat dither mask having a threshold value set so as not to form a dot with the overcoat ink on the part of pixels.

According to a second aspect of the present disclosure, there is provided a method of recording a dot on a recording medium in a recording apparatus including a head including a first nozzle row configured to discharge a plurality of drawing inks, and a second nozzle row configured to discharge an overcoat ink posterior to the drawing inks. This recording method includes a dot-data generating step of performing dot-data generating processing including halftone processing using a dither mask to generate dot data indicating presence or absence of formation of a dot on the printing medium. In the dot-data generating step, when generating dot data used to perform recording in accordance with a first recording mode in which no nozzle that discharges the overcoat ink is assigned to part of pixels in a recording target region of the recording medium, the first recording mode being a recording mode using the second nozzle row, the dot data is generated by using a first overcoat dither mask having a threshold value set so as not to form a dot with the overcoat ink on the part of pixels.

BRIEF DESCRIPTION OF THE DRAWINGS

FIG. 7 is an explanatory view schematically illustrating part of the configuration of a first overcoat dither mask.

DESCRIPTION OF EXEMPLARY EMBODIMENTS

A. First Embodiment

Figure 1:
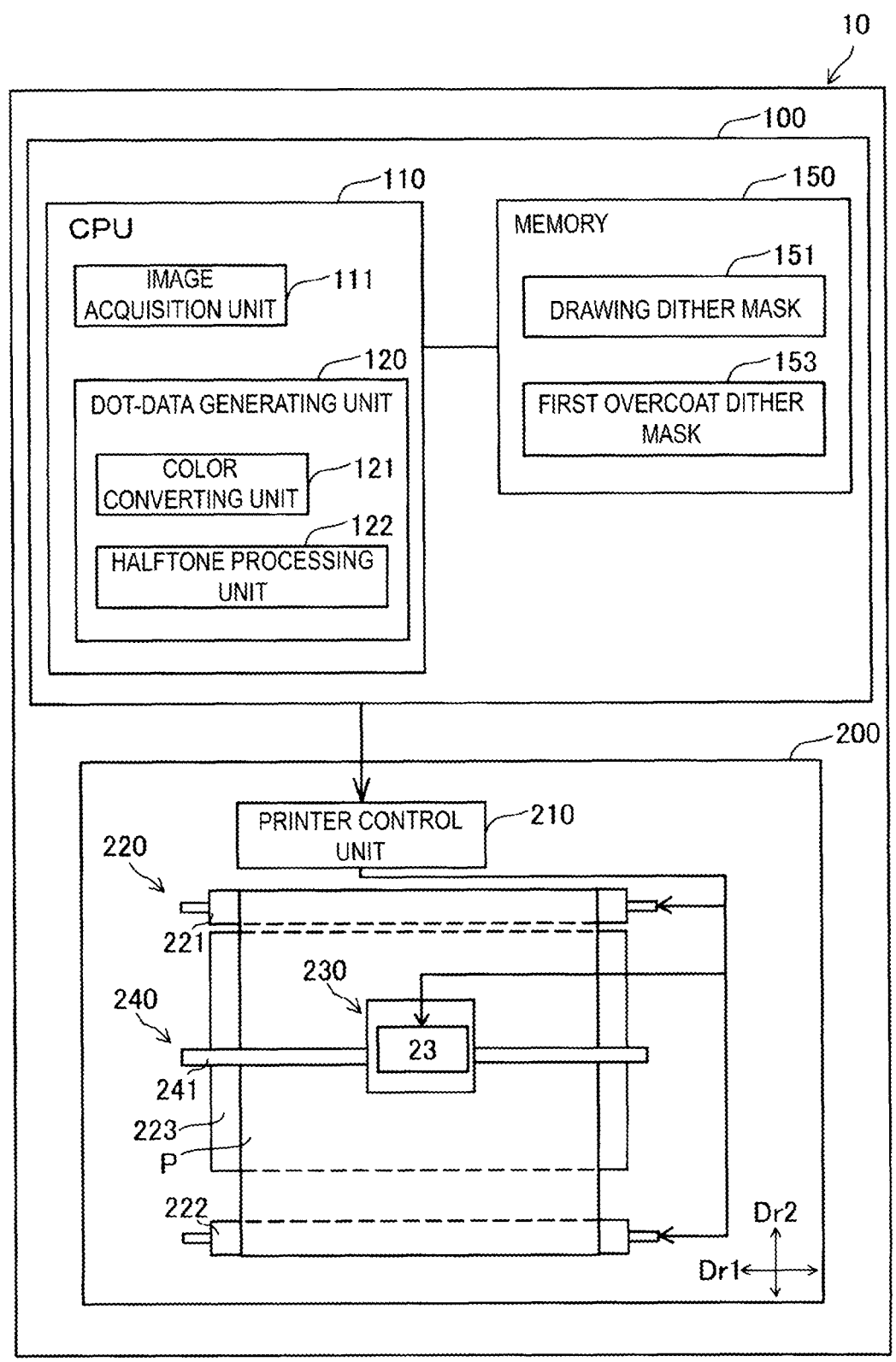
FIG. 1 is a block diagram illustrating a schematic configuration of a printing system according to an embodiment of the present disclosure.

FIG. 1 is a block diagram illustrating a schematic configuration of a printing system 10 according to an embodiment of the present disclosure. The printing system 10 according to the present embodiment includes an image processing apparatus 100 and a printer 200 that actually prints an image under the control of the image processing apparatus 100. The printing system 10 as a whole functions as a printing apparatus in a broad sense. The printing system 10 performs overcoat printing. In the overcoat printing, a plurality of drawing inks is discharged onto a printing medium P to form dots on the printing medium P to print an image. Then, overcoat inks are discharged onto the dots formed on the printing medium P to make the surface of the dots uniform to suppress reflection of light, thereby improving the density of the image. In the following description, the overcoat printing is referred to as "OC printing."

The image processing apparatus 100 is configured as a computer including a CPU 110, a memory 150, and an input-output interface that is not illustrated.

The CPU 110 deploys a printing process program stored in the memory 150 and executes this program to function as an image acquisition unit 111 and a dot-data generating unit 120. Note that the dot-data generating unit 120 includes a color converting unit 121 and halftone processinging unit 122.

The image acquisition unit 111 acquires, from the memory 150, image data on an image to be printed. The dot-data generating unit 120 performs dot-data generating processing, which will be described later, to generate dot data indicating a state of recording a dot and corresponding to image data, the dot data being used to record a plurality of dots on a printing medium P. Note that the wording "recording a dot" means that a dot is formed or a dot is not formed. The color converting unit 121 uses a look-up table (not illustrated) stored in the memory 150 in advance to convert image data on an input image into data on the amount of inks in a CMYK color system. The halftone processing unit 122 performs halftone processing using a dither mask to convert the data on the amount of inks into the presence or absence of recording of a dot on the printing medium P, in other words, a two-step gradation value made out of the presence of dot formation and the absence of dot formation.

The memory 150 holds a drawing dither mask 151, a first overcoat dither mask 153, and a print processing program that is not illustrated. The dither masks 151 and 153 are used in the halftone processing and in the present embodiment, have a threshold set so as to have a blue noise property. The drawing dither mask 151 is used when dot data on the drawing ink is generated. The first overcoat dither mask 153 is used when dot data on the OC ink is generated.

The printer 200 includes a printer control unit 210, a transport unit 220, a carriage moving unit 240, and a carriage 230 including a printing head 23.

The printer control unit 210 is configured as a computer including a CPU, a memory, and an input-output interface, and controls the transport unit 220, the carriage moving unit 240, and the printing head 23 on the basis of print data received from the image processing apparatus 100.

The transport unit 220 includes a supplying roller 221 around which a printing medium P is wound, a pick-up roller 222 that stores the transported printing medium P in the form of a roll, and a platen 223 that supports the printing medium P. The transport unit 220 transports the printing medium P from the supply roller 221 to the pick-up roller 222 under the control of the printer control unit 210 to move the printing medium P in a sub scanning direction Dr2.

The carriage moving unit 240 includes a carriage guide shaft 241 and a carriage motor that is not illustrated. The carriage guide shaft 241 is disposed along a primary scanning direction Dr1 intersecting the sub scanning direction Dr2, and both ends of the carriage guide shaft 241 are fixed to the housing of the printer 200. The primary scanning direction Dr1 is also the width direction of the printing medium P. The carriage 230 is attached to the carriage guide shaft 241 so as to be able to reciprocate along the primary scanning direction Dr1. Under the control of the printer control unit 210, the carriage moving unit 240 drives the carriage motor to reciprocate the carriage 230 along the primary scanning direction Dr1.

The printing head 23 provided in the carriage 230 discharges ink droplets onto the printing medium P to form dots under the control of the printer control unit 210.

With the configuration described above, the printer control unit 210 causes the carriage moving unit 240 to transport the printing head 23 provided in the carriage 230 in the primary scanning direction Dr1 while causing the transport unit 220 to transport the printing medium P in the sub scanning direction Dr2. In addition, the printer control unit 210 causes inks to be discharged from nozzles of the printing head 23 to form dots, thereby printing an image on the printing medium P.

Figure 2:
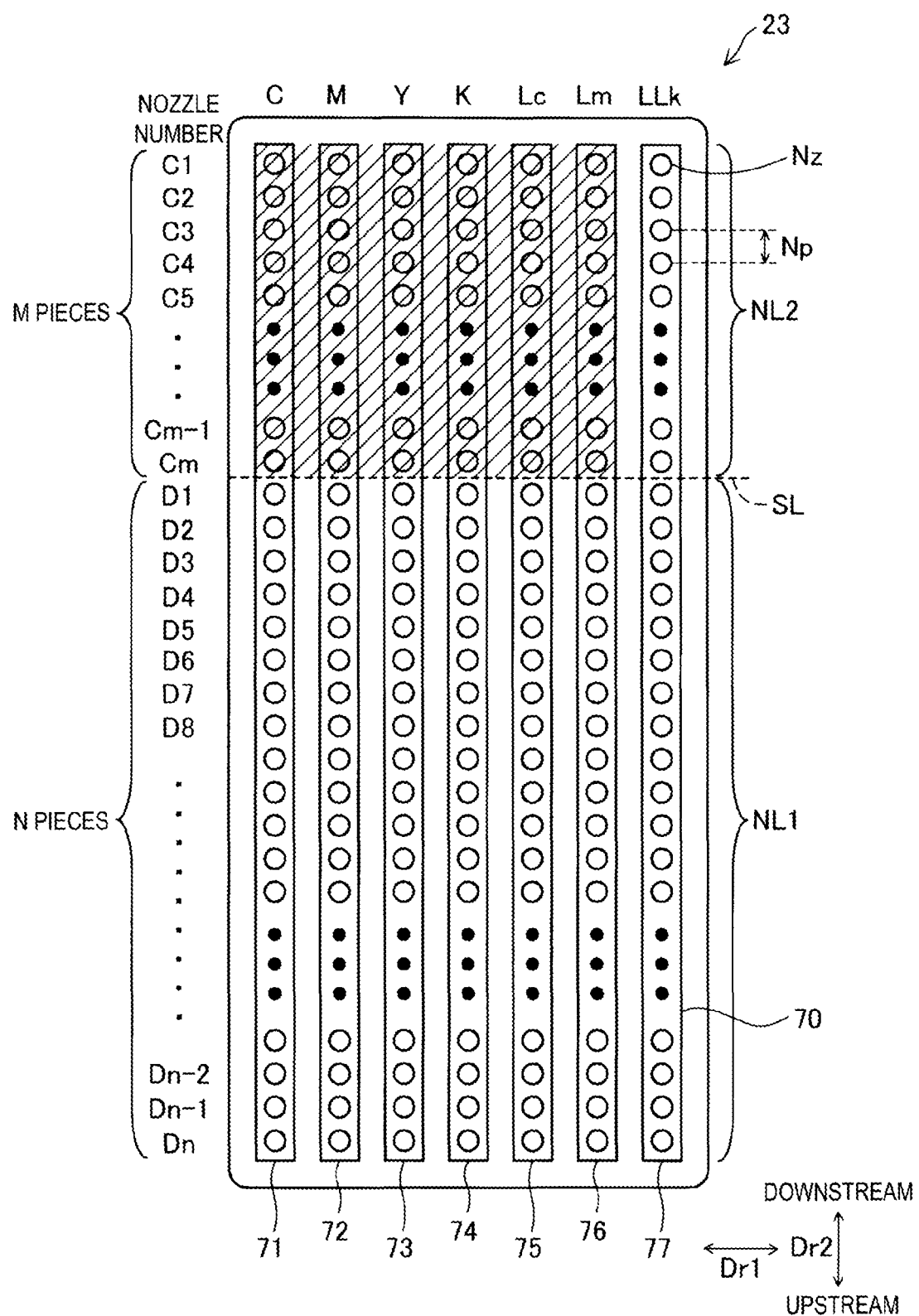
FIG. 2 is an explanatory view schematically illustrating one example of arrangement of nozzles in a printing head.

FIG. 2 is an explanatory view schematically illustrating an example of arrangement of nozzles of the printing head 23. FIG. 2 illustrates a surface of the printing head 23 that faces the printing medium P. The printing head 23 includes a nozzle row 70 for each ink color. Specifically, the printing head 23 includes a nozzle row 71 of a cyan ink C, a nozzle row 72 of a magenta ink M, a nozzle row 73 of a yellow ink Y, a nozzle row 74 of a black ink K, a nozzle row 75 of a light cyan ink Lc having lightness higher than the cyan ink C, a nozzle row 76 of a light magenta ink Lm having lightness higher than the magenta ink M, and a nozzle row 77 of an ultra-light black ink LLk having lightness higher than the black ink K.

Each nozzle row 70 has a plurality of nozzles Nz arranged at a certain nozzle pitch Np along the sub scanning direction Dr2. The nozzle pitch Np is an integer multiple of a pixel pitch on the printing medium P. Each of the nozzles Nz includes a piezoelectric element used to discharge an ink with each of the nozzles Nz being driven. An ink of each ink color is supplied from an ink tank, which is not illustrated, to each of the nozzles Nz. The piezoelectric element is driven with the control of the printer control unit 210 to discharge, from each of the nozzles Nz, each of the cyan ink C, the magenta ink M, the yellow ink Y, the black ink K, the light cyan ink Lc, the light magenta ink Lm, and the ultra-light black ink LLk. It should be noted that various types of manners may be used for the manner of discharging an ink, which includes, for example, a manner in which a heating element is used to generate a bubble within the nozzle Nz, and the ink is discharged using this bubble.

As indicated by the dashed line SL, each nozzle row 70 is divided into two nozzle rows NL1 and NL2 from the upstream side in the sub scanning direction Dr2. The first nozzle row NL1 is used for drawing, and the second nozzle row NL2 is used for overcoating. The first nozzle row NL1 and the second nozzle row NL2 are classified by dividing the number of nozzles Nz in the nozzle row 70 using a predetermined ratio. The total of n-pieces of nozzles #D1 to #Dn located upstream in the nozzle rows 71, 72, 73, 74, 75, 76, and 77 is assigned as the first nozzle row NL1. The total of m-pieces of nozzles #C1 to #Cm located downstream in the nozzle row 77 is assigned as the second nozzle row NL2. The second nozzle row NL2 does not include nozzles Nz ranging from the nozzles #C1 to Cm located downstream in the nozzles rows 71, 72, 73, 74, 75, and 76 as illustrated as the hatched area. The "n" and "m" described above are natural numbers. In the present embodiment, the number n of nozzles in the first nozzle row NL1 is greater than the number m of nozzles in the second nozzle row NL2.

The first nozzle row NL1 discharges the drawing ink. Thus, in the present embodiment, the cyan ink C, the magenta ink M, the yellow ink Y, the black ink K, the light cyan ink, the light magenta ink Lm, and the ultra-light black ink LLk correspond to the drawing ink. In the present embodiment, since the number n of nozzles in the first nozzle row NL1 is greater than the number m of nozzles in the second nozzle row NL2 as described above, it is possible to improve the speed at which an image is printed on the printing medium P with the drawing ink, as compared with a case where the number n of nozzles in the first nozzle row NL1 and the number m of nozzles in the second nozzle row NL2 are equal.

The second nozzle row NL2 discharges the overcoat ink. Thus, in this embodiment, the ultra-light black ink LLk corresponds to the overcoat ink. The ultra-light black ink LLk is an achromatic color ink having a density lower than the black ink K having the highest density of the black ink K and the ultra-light black ink LLk that are achromatic color inks included in the drawing ink. In the following description, the overcoat ink is referred to as an "OC ink." The OC ink is discharged posterior to the drawing ink.

Figure 3:
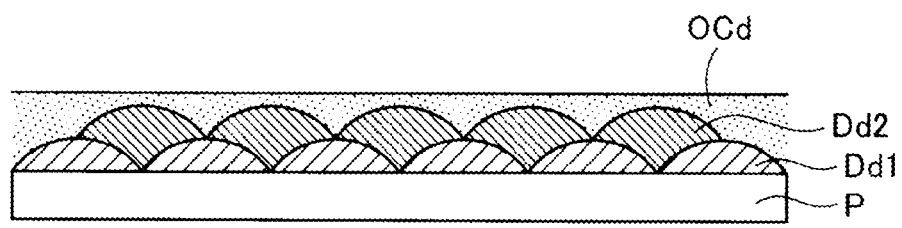
FIG. 3 is an explanatory view schematically illustrating a cross-section of a printed image formed on a printing medium.

FIG. 3 is an explanatory view schematically illustrating a cross-section of a printed image formed on the printing medium P. Dots Dd1 and Dd2 with the drawing inks are formed on the printing medium P. Then, the OC ink is discharged onto the formed dots to form a layer OCd of the OC ink. Thus, the layer OCd of the OC ink makes the surface of the printing medium P uniform, and also suppresses reflection of light, thereby improving the density of the image on the printing medium P.

Figure 4:
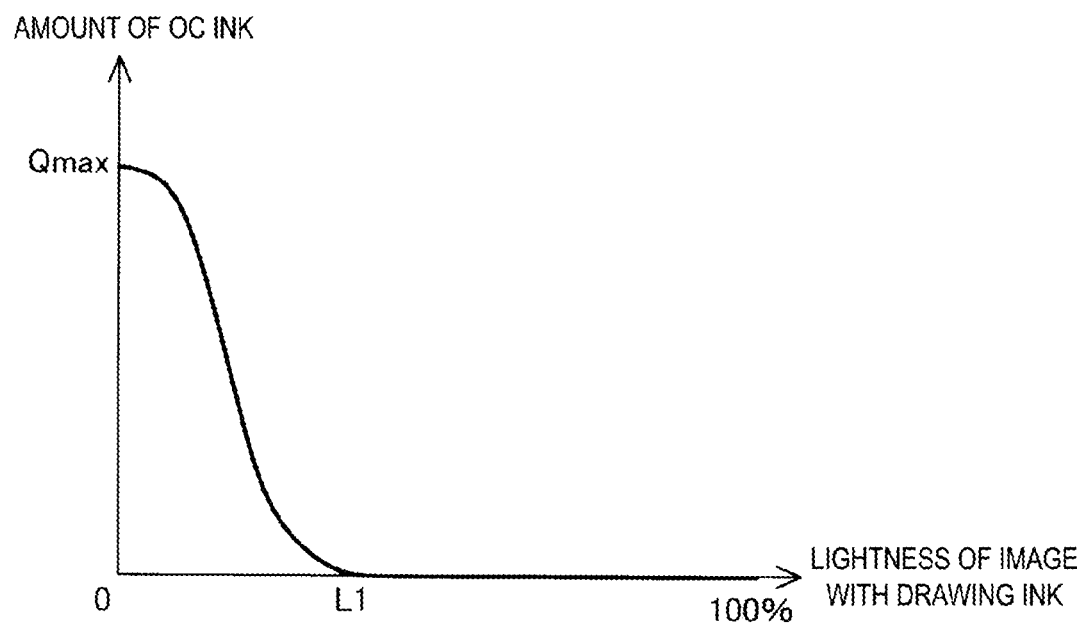
FIG. 4 is an explanatory view illustrating a relationship between the lightness of an image drawn using a drawing ink and the ink amount of an OC ink.

FIG. 4 is an explanatory diagram illustrating a relationship between the lightness of an image drawn using the drawing ink and the ink amount of the OC ink. In FIG. 4, the horizontal axis indicates the lightness of an image drawn using the drawing ink, and the vertical axis indicates the ink amount of the OC ink. The lightness of an image represents a value obtained by using a spectrophotometer to measure the brightness of the image before overcoat with the OC ink. As illustrated in FIG. 4, the ink amount of the OC ink reduces with increase in the brightness of the image. Specifically, when the brightness of the image is 0%, the ink amount Qmax of the OC ink is 10%. The ink amount of the OC ink gradually reduces with increase in the lightness of the image, and stays 0% after the lightness of the image exceeds a predetermined value L1 and until the lightness reaches 100%. The predetermined value L1 is a value ranging, for example, from 20% to 40%. Note that the ink amount Qmax of the OC ink when the lightness of the image is 0% may be any amount of ink ranging, for example, from 4% to 15%.

Figure 5:
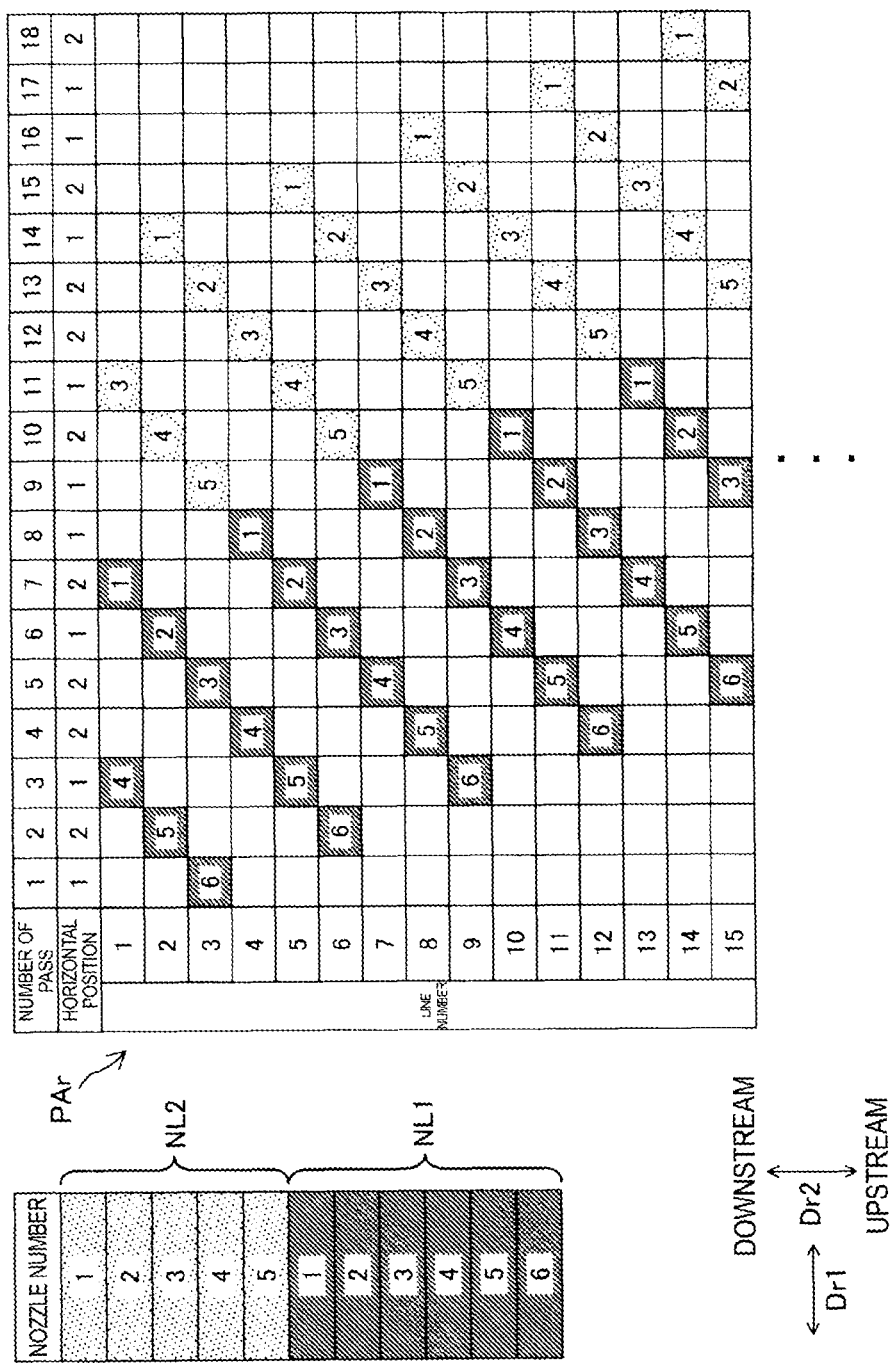
FIG. 5 is an explanatory view illustrating a dot recording mode concerning an ultra-light black ink.

FIG. 5 is an explanatory view illustrating a dot recording mode concerning the ultra-light black ink LLk. FIG. 5 illustrates positions of nozzles Nz assigned to individual pixels in a printing target region PAr when the number n of nozzles in the first nozzle row NL1 is set to six, the number m of nozzles in the second nozzle row NL2 is set to five, the number of primary scanning passes per line is set to two, the nozzle pitch Np is set to four, and the amount of feed in the sub scanning direction Dr2 after each primary scanning pass is set to three, for the purpose of facilitating understanding. The "printing target region PAr" represents a range where inks can be discharged onto all of the pixels in the printing medium P using the first nozzle row NL1 for drawing. Since the number of primary scanning passes per line is two, the plurality of pixel positions on one line are classified into first horizontal pixel positions, which are odd-numbered pixel positions, and second horizontal pixel positions, which are even-numbered pixel positions. During one first primary scanning pass, it is possible to discharge an ink only at any of these pixel positions.

In each primary scanning pass, inks are discharged in the following manner. Specifically, in the first primary scanning pass, the #6 nozzle Nz in the first nozzle row NL1 discharges an ink at the first horizontal pixel position in the number 3 raster line. In the second primary scanning pass, the #5 and #6 nozzles Nz in the first nozzle row NL1 discharge inks at the second horizontal pixel position in the number 2 and number 6 raster lines. In the third primary scanning pass, the #4, #5, and #6 nozzles Nz in the first nozzle row NL1 discharge inks at the first horizontal pixel position in the number 1, number 5, and number 9 raster lines. After this, primary scanning passes are sequentially executed in a similar manner to sequentially discharge the drawing ink at the first and second horizontal pixel positions in each number of the raster lines.

In and after the ninth primary scanning pass, the OC ink is discharged using the second nozzle row NL2, in addition to discharging of the drawing ink. Specifically, in the ninth primary scanning pass, the #1, #2, and #3 nozzles Nz in the first nozzle row NL1 discharge drawing inks at the first horizontal pixel position in the number 7, number 11, and number 15 raster lines whereas the #5 nozzle Nz in the second nozzle row NL2 discharges an OC ink at the first horizontal pixel position in the number 3 raster line. In the tenth primary scanning pass, the #1 and #2 nozzles Nz in the first nozzle row NL1 discharge drawing inks at the second horizontal pixel position in the number 10 and number 14 raster lines whereas the #4 and #5 nozzles Nz in the second nozzle row NL2 discharge OC inks at the second horizontal pixel position in the number 2 and number 6 raster lines. In the eleventh primary scanning pass, the #1 nozzle Nz in the first nozzle row NL1 discharges a drawing ink at the first horizontal pixel position in the number 13 raster line whereas the #3, #4, and #5 nozzles Nz in the second nozzle row NL2 discharge OC inks at the first horizontal pixel position in the number 1, number 5, and number 9 raster lines. After this, primary scanning passes are sequentially executed in a similar manner to sequentially discharge the OC ink at the first and second horizontal pixel positions in each number of the raster lines.

Of all the raster lines illustrated in FIG. 5, in the raster lines numbered 2, 3, 5, 6, 8, 9, 11, 12, 14, and 15, inks can be discharged twice using the second nozzle row NL2, and dots with the OC ink can be discharged for all the pixels. In contrast, in the raster lines numbered 1, 4, 7, 10, and 13, the discharge of the ink using the second nozzle row NL2 can be performed only once, and the OC ink cannot be discharged for some pixels.

Figure 6:
FIG. 6 is an explanatory view illustrating a result of printing using the dot recording mode illustrated in FIG. 5.

FIG. 6 is an explanatory view illustrating a result of printing using the dot recording mode illustrated in FIG. 5. In the raster lines numbered 1, 4, 7, 10, and 13, there are pixels to which no nozzle Nz in the second nozzle row NL2 is assigned. Specifically, in the number 1 raster line, the OC ink cannot be discharged at the second horizontal pixel position, as illustrated in FIG. 5. Thus, in FIG. 6, hatching is applied to the second horizontal pixel positions, indicating that no nozzle Nz in the second nozzle row NL2 is assigned. Similarly, in the number 4 raster line, no nozzle Nz in the second nozzle row NL2 is assigned to the first horizontal pixel position. In a manner similar to the number 4 raster line, in the number 7 and number 13 raster lines, no nozzle Nz in the second nozzle row NL2 is assigned to the first horizontal pixel position. In a manner similar to the number 1 raster line, in the number 10 raster line, no nozzle Nz in the second nozzle row NL2 is assigned to the second horizontal pixel position.

Thus, at the time of generating dot data used to form a dot with the OC ink, even when a decision to form a dot is made to a pixel to which no nozzle Nz in the second nozzle row NL2 is assigned, in other words, a pixel onto which the OC ink cannot be discharged, no dot is formed on this pixel at the time of printing. Thus, at the time of generating dot data in a recording mode in which no nozzle Nz that discharges the OC ink using the second nozzle row NL2 is assigned to part of pixels in the printing target region PAr of the printing medium P, the present embodiment generates dot data in which no dot with the OC ink is formed on these pixels. Specifically, dot data is generated using a first overcoat dither mask 153 having a threshold value so as not to form a dot with the OC ink on a pixel to which no nozzle Nz that discharges the OC ink is assigned. Note that, in the following description, the "first recording mode" represents a recording mode in which no nozzle Nz that discharges the OC ink is assigned to part of pixels in the printing target region PAr.

FIG. 7 is an explanatory view schematically illustrating part of the configuration of the first overcoat dither mask 153. FIG. 7 illustrates a configuration of seven pixels in each of the primary scanning direction Dr1 and the sub scanning direction Dr2 in the printing target region PAr. The hatched pixels correspond to the pixels to which no nozzle Nz in the second nozzle row NL2 are assigned in FIG. 6. In the first overcoat dither mask 153, the maximum threshold value of 255 is set to a pixel to which no nozzle Nz that discharges the OC ink is assigned, whereas a threshold value that falls in a range of 1 to 255 is set to a pixel to which a nozzle Nz that discharges the OC ink is assigned. Thus, for the pixel to which no nozzle Nz that discharges the OC ink is assigned, it is least likely that determination is made that a dot is formed on this pixel. It is only necessary that the threshold value set for the pixel to which no nozzle Nz that discharges the OC ink is assigned is greater than a value corresponding to the maximum ink amount Qmax of the OC ink in FIG. 4.

Figure 8:
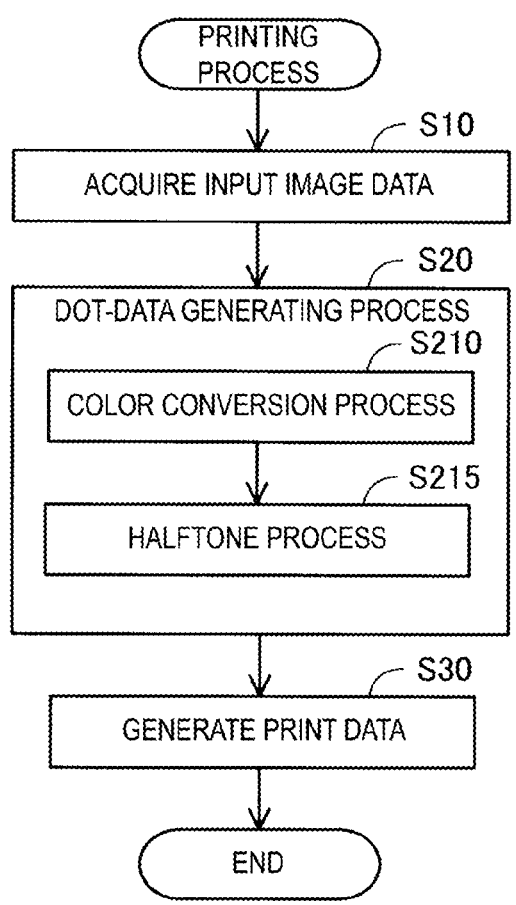
FIG. 8 is a flowchart illustrating a process procedure of a printing process.

FIG. 8 is a flowchart illustrating a process procedure of the printing process. A user designates image data on the image processing apparatus 100 to give an instruction to print. This causes a printing process to be executed. In step S10, the image acquisition unit 111 acquires input image data from the memory 150. In the present embodiment, the input image data is raster data in a form of RGB.

In step S20, the dot-data generating unit 120 performs dot-data generating processing. The dot-data generating processing includes a color conversion process and halftone processing. In step S210, the color converting unit 121 performs the color conversion process and uses a look-up table (not illustrated) stored in the memory 150 in advance to convert data in a form of RGB into data on the amount of inks in a CMYK color system. In step S215, the halftone processing unit 122 performs the halftone processing to generate dot data on the drawing ink and dot data on the OC ink. Specifically, the halftone processing unit 122 uses the drawing dither mask 151 to convert data on the ink amount of each drawing ink into dot data. The halftone processing unit 122 uses the first overcoat dither mask 153 to convert data on the ink amount of the OC ink into dot data.

In step S30, the CPU 110 generates print data and outputs the print data to the printer 200. Specifically, the CPU 110 performs a rasterizing process in which the dot data generated in the halftone processing is divided into dot data per primary scanning pass. The CPU 110 adds a print control command to the rasterized data to generate print data, and outputs the print data to the printer 200. The printer control unit 210 prints an image onto a printing medium P on the basis of the outputted print data. The print control command includes, for example, information regarding the type of printing medium P, transport data regarding the amount of transport or the speed of the printing medium P in the sub scanning direction Dr2 in one sub scanning, and the like. It should be noted that the information regarding the type of printing medium P may be output to the printer 200 separately from the print control command.

Figure 9:
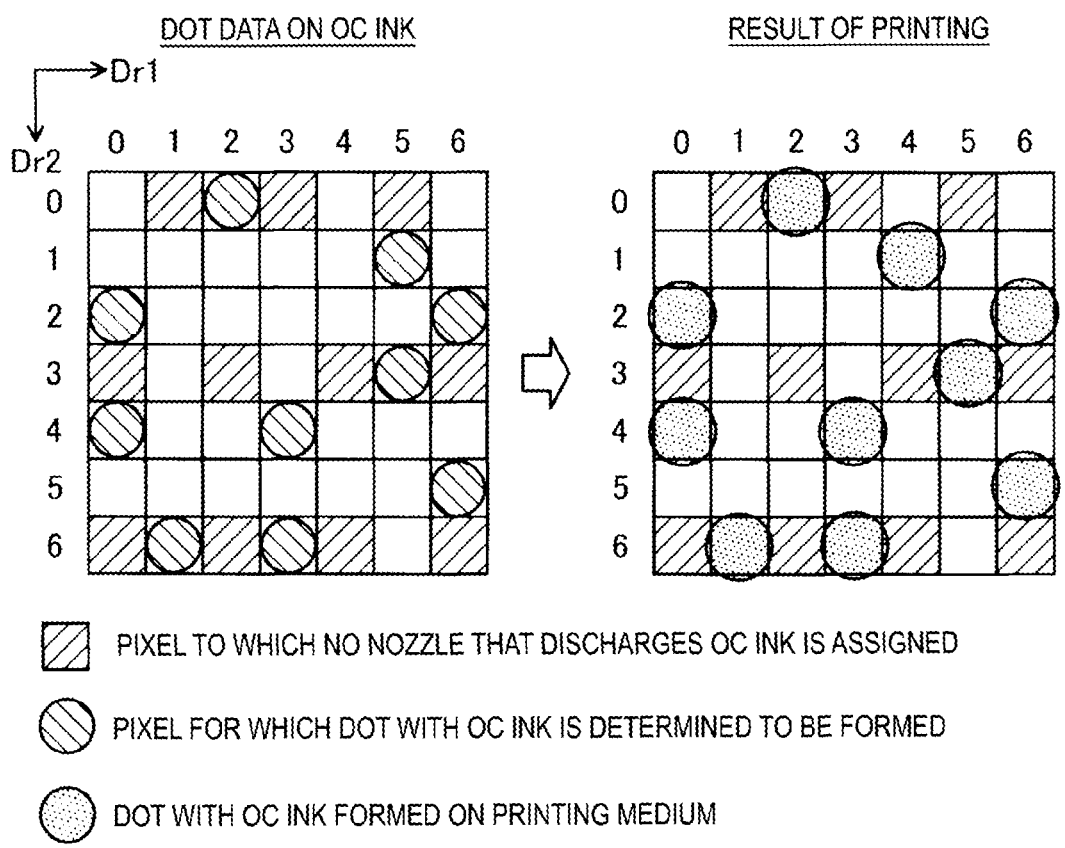
FIG. 9 is an explanatory view schematically illustrating dot data on an OC ink and a result of printing.

FIG. 9 is an explanatory view schematically illustrating dot data on the OC ink and a result of printing. FIG. 9 illustrates seven pixels in each of the primary scanning direction Dr1 and the sub scanning direction Dr2 in the printing target region PAr. The hatched pixels are pixels to which no nozzle Nz that discharge the OC ink is assigned, and correspond to the positions of pixels to which no nozzle Nz in the second nozzle row NL2 is assigned in FIG. 6. In the dot data on the OC ink illustrated in the left view in FIG. 9, pixels on which a dot with the OC ink is determined to be formed are pixels to which a nozzle Nz that discharges the OC ink is assigned. In other words, for pixels to which no nozzle Nz that discharges the OC ink is assigned, determination is not made that a dot with the OC ink is formed.

As illustrated in the right view in FIG. 9, dots with the OC ink are formed on the printing medium P so as to match the presence or absence of formation of a dot indicated in the dot data on the OC ink. In other words, the dots with the OC ink are not thinned out at the time of printing.

Figure 10:
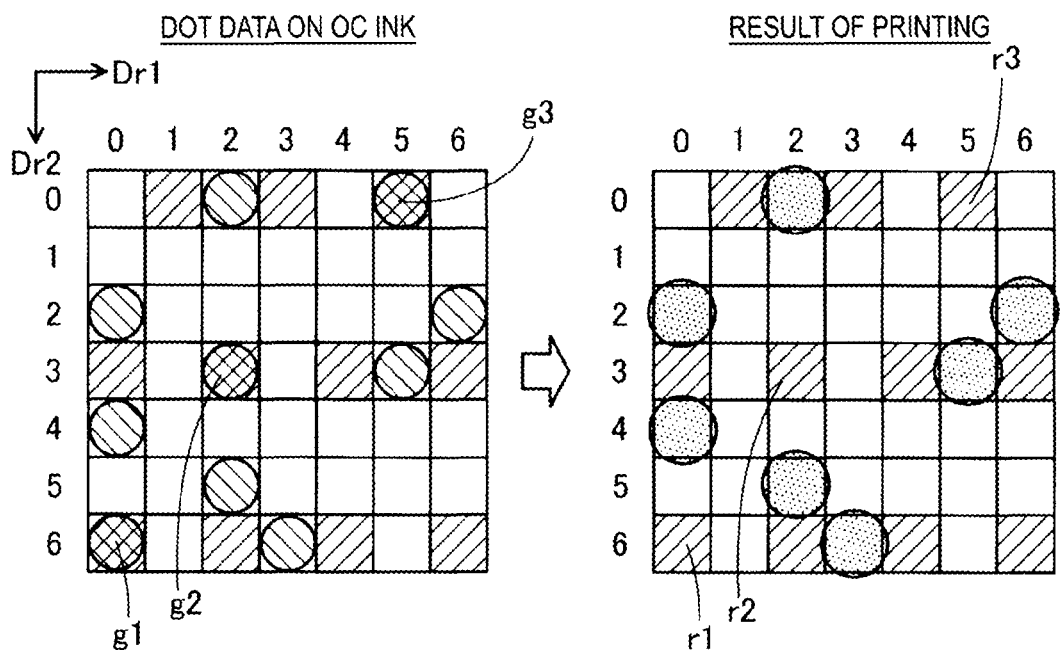
FIG. 10 is an explanatory view schematically illustrating dot data on an OC ink and a result of printing in a case of a comparative example.

FIG. 10 is an explanatory view schematically illustrating dot data on the OC ink and a result of printing in a case of a comparative example. As in FIG. 9, FIG. 10 illustrates seven pixels in each of the primary scanning direction Dr1 and the sub scanning direction Dr2 in the printing target region PAr. The hatched pixels are pixels to which no nozzle Nz that discharge the OC ink is assigned, and correspond to the positions of pixels to which no nozzle Nz in the second nozzle row NL2 is assigned in FIG. 6. The dot data illustrated in FIG. 10 is generated using the drawing dither mask 151.

As illustrated in the left view of FIG. 10, in the dot data on the OC ink according to the comparative example, it is determined that a dot with the OC ink is formed for pixels g1, g2, and g3 to which no nozzle Nz that discharge the OC ink is assigned. Thus, as illustrated in the right view of FIG. 10, no dots are formed in the pixels r1, r2, and r3 on the printing medium P, and dots with the OC ink are thinned out in the pixels r1, r2, and r3. Thus, in an image, the lightness differs between a pixel in which a dot with the OC ink is formed and the pixels r1, r2, and r3 to which dots with the OC ink cannot be formed although dots with the OC ink need to be formed. This leads to a possibility that lines having varied density appear.

With the first embodiment described above, at the time of generating dot data used to perform recording in accordance with the first recording mode in which no nozzle Nz that discharges the OC ink using the second nozzle row NL2 is assigned to part of pixels in the printing target region PAr of the printing medium P, the dot-data generating unit 120 generates dot data by using the first overcoat dither mask 153 having a threshold value set so as not to form a dot with the OC ink on the part of pixels. This makes it possible to generate dot data in which a dot with the OC ink is formed only on a pixel to which a nozzle Nz that discharges the OC ink is assigned. Thus, by performing printing using the dot data, it is possible to suppress the dots with the OC ink from being thinned out at the time of printing. This makes it possible to suppress occurrence of a raster line in which no dot with the OC ink is formed on the printing medium P. Thus, it is possible to suppress occurrence of lines having varied density in the result of printing.

Since the first overcoat dither mask 153 has a blue noise property, it is possible to print a printed image with favorable image quality.

B. Second Embodiment

Figure 11:
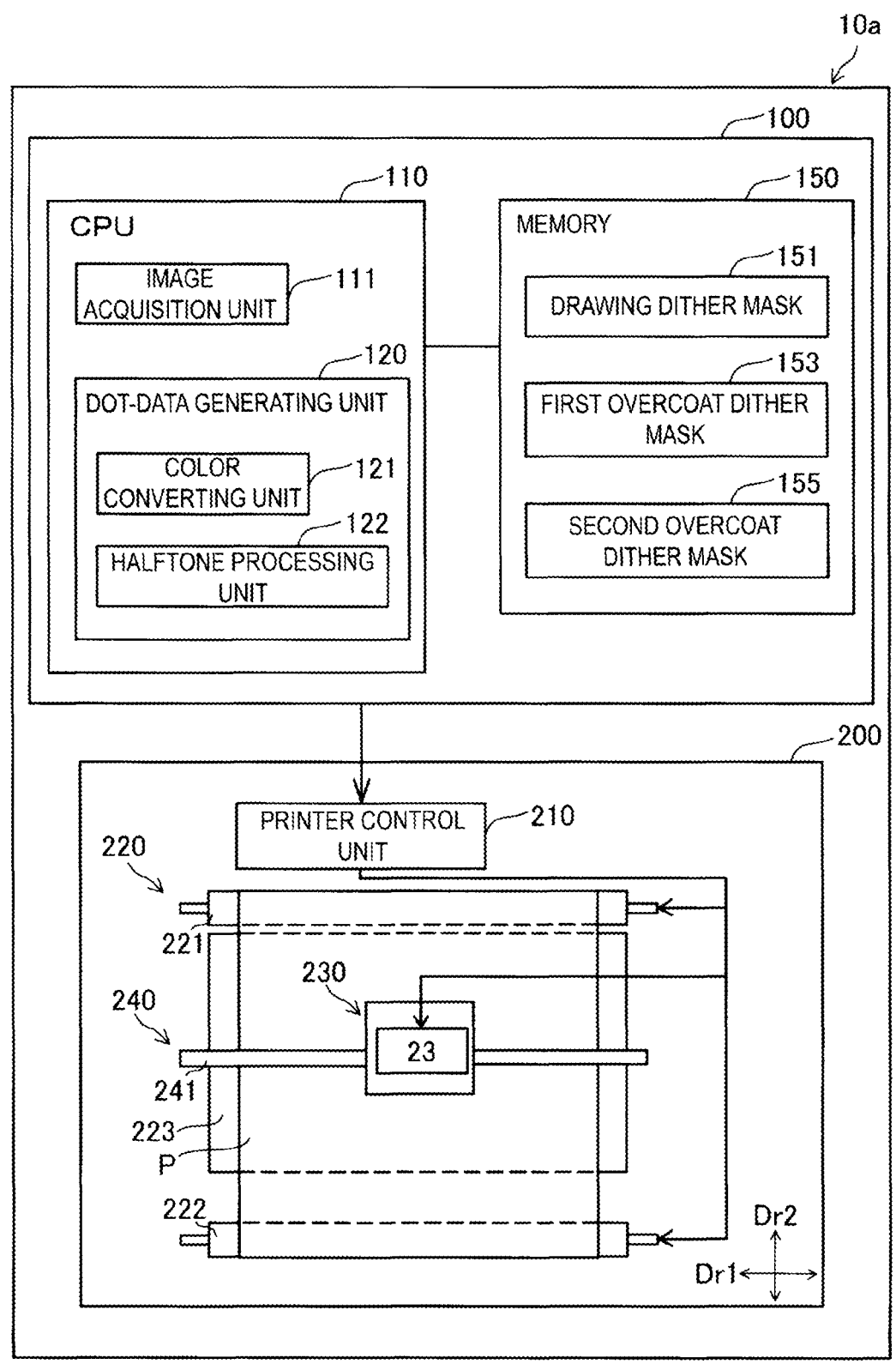
FIG. 11 is a block diagram illustrating a schematic configuration of a printing system according to a second embodiment.

FIG. 11 is a block diagram illustrating a schematic configuration of a printing system 10a according to a second embodiment. The printing system 10a differs from the first embodiment in that the second overcoat dither mask 155 is added in the memory 150. Other configurations of the printing system 10a are the same as those of the first embodiment. Thus, the same reference characters are attached to the same constituent elements, and detailed description thereof will not be repeated.

The halftone processing unit 122 according to the first embodiment uses the first overcoat dither mask 153 when dot data in the first recording mode is generated. In contrast, the halftone processing unit 122 according to the second embodiment uses a second overcoat dither mask 155 when dot data in a second recording mode, which will be described later, is generated.

Figure 12:
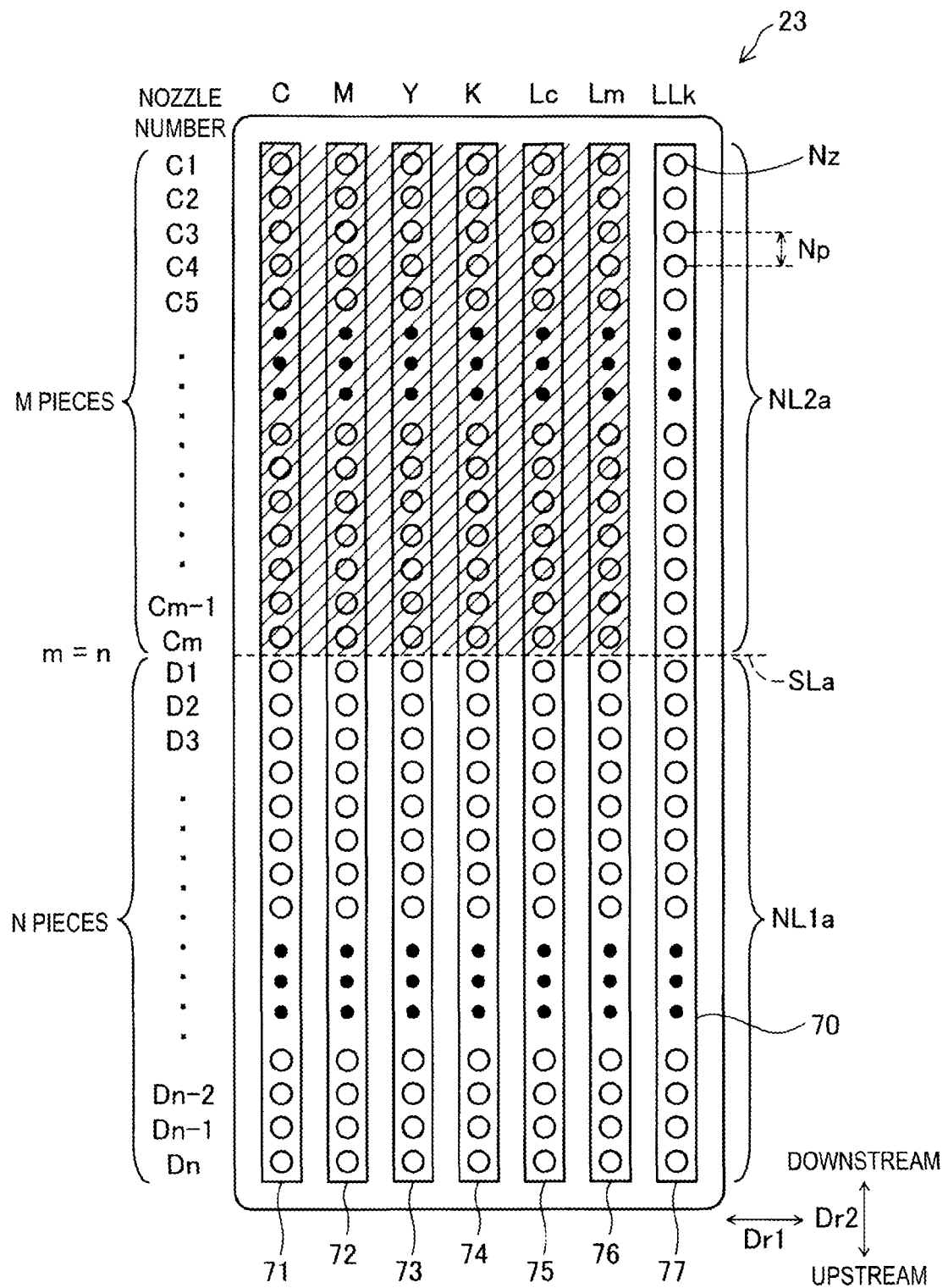
FIG. 12 is an explanatory view schematically illustrating an example of arrangement of nozzles used in a second recording mode according to the second embodiment.

FIG. 12 is an explanatory view schematically illustrating an example of arrangement of nozzles Nz used in the second recording mode according to the second embodiment. In a case of the second embodiment, the number n of nozzles in a first nozzle row NL1a and the number m of nozzles in a second nozzle row NL2a are equal, as indicated by the dashed line SLa. Note that the total number of nozzles Nz in each of the nozzle rows 70 is the same as that in the first embodiment. Thus, in a case of the second embodiment, although the speed at which an image is printed on the printing medium P using the drawing ink reduces, it is possible to assign nozzles Nz in the second nozzle row NL2a to the all the pixels in the printing target region PAr. In other words, it is possible to discharge the OC ink onto all the pixels in the printing target region PAr using the second nozzle row NL2a. This eliminates the need of using the first overcoat dither mask 153 at the time of generating dot data on the OC ink. Note that, in the following description, the "second recording mode" represents a recording mode in which a nozzle Nz that discharges the OC ink is assigned to all the pixels in the printing target region PAr using the second nozzle row NL2a.

Figure 13:
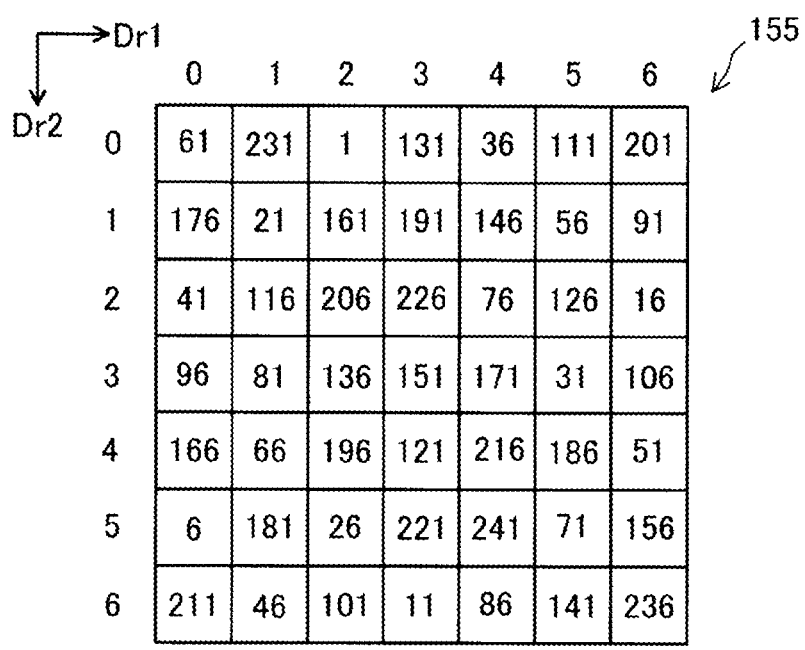
FIG. 13 is an explanatory view schematically illustrating part of a configuration of a second overcoat dither mask.

FIG. 13 is an explanatory view schematically illustrating part of the configuration of the second overcoat dither mask 155. As in FIG. 7, FIG. 13 illustrates a configuration of seven pixels in each of the primary scanning direction Dr1 and the sub scanning direction Dr2 in the printing target region PAr. In the second overcoat dithering mask 155, a threshold value that falls in a range of 1 to 255 is set. The second overcoat dithering mask 155 may be set to have a threshold value so as to have a blue noise property, as in the first embodiment.

With the second embodiment described above, at the time of generating dot data used to perform recording in accordance with the second recording mode, the dot-data generating unit 120 generates dot data using the second overcoat dither mask 155. This makes it possible to form a dot with the OC ink on a given pixel in the printing target region PAr while increasing the dispersibility of dots with the OC ink.

C. Other Embodiments (1) In each of the embodiments described above, the OC ink is an ultra-light black ink LLk. However, the present disclosure is not limited to this. For example, the OC ink may be a light cyan ink Lc. In this case, it is possible to improve the lightness of a cyan color of an image on the printing medium P. In addition, for example, the OC ink may be a light magenta Lm. In this case, it is possible to improve the lightness of a magenta color of an image on the printing medium P. Furthermore, for example, the OC ink may be a clear ink. In this case, it is possible to create a glossy feeling on the printing medium P.

(2) In each of the embodiments described above, the dither masks 151, 153, and 155 are set to have a threshold value so as to have a blue noise property. However, in place of the blue noise property, the threshold value may be set so as to have a green noise property.

(3) Each of the embodiments described above describes the printer 200 that discharges inks onto the printing medium P. However, the dot-data generating processing according to the present disclosure may be applied to various types of recording device that discharges inks onto the printing medium to record dots.

In each of the embodiments described above, part of the configuration achieved by the hardware may be replaced with software. Alternatively, part of the configuration achieved by the software may be replaced with hardware. Furthermore, when part of the functions or the entire functions of the present disclosure is achieved by the software, the software (computer program) may be provided in a form stored in a computer-readable recording medium. In the present disclosure, the "computer-readable recording medium" is not limited to a portable recording medium such as a flexible disk and a CD-ROM, but includes various internal storage devices in a computer such as a RAM and a ROM and various external storage devices fixed to a computer such as a hard disk. In other words, the "computer-readable recording medium" has a broad range of definition including any recording device that can fixedly store data rather than temporarily.

The present disclosure is not limited to the embodiments described above, and can be achieved in various configurations without departing from the gist of the present disclosure. For example, it is possible to appropriately replace or combine the technical features in the embodiments that correspond to the technical features in each of the aspects described in the summary section of the present disclosure, in order to solve part of or all of the problems described above or achieve part of or all of the effects described above. In addition, when the technical features are not described herein as essential technical features, such technical features can be deleted as appropriate.

D. Other Aspects (1) According to a first aspect of the present disclosure, a recording device is provided. This recording device includes: a head including a first nozzle row configured to discharge a plurality of drawing inks, and a second nozzle row configured to discharge an overcoat ink posterior to the drawing inks; and a dot-data generating unit configured to perform dot-data generating processing including halftone processing using a dither mask to generate dot data indicating presence or absence of formation of a dot on the printing medium. When generating dot data used to perform recording in accordance with a first recording mode in which no nozzle that discharges the overcoat ink is assigned to part of pixels in a recording target region of the recording medium, the first recording mode being a recording mode using the second nozzle row, the dot-data generating unit is configured to generate the dot data by using a first overcoat dither mask having a threshold value set so as not to form a dot with the overcoat ink on the part of pixels.

With the recording device according to this aspect, at the time of generating dot data used to perform recording in accordance with the first recording mode in which no nozzle that discharges the overcoat ink is assigned to part of pixels in the recording target region, the first recording mode being a recording mode using the second nozzle row, the dot-data generating unit generates the dot data using the first overcoat dither mask having a threshold value set so as not to form a dot with the overcoat ink on the part of pixels. This makes it possible to generate the dot data in which a dot with the overcoat ink is formed only on a pixel to which a nozzle that discharges the overcoat ink is assigned. Thus, it is possible to suppress dots with the overcoat ink from being thinned out at the time of recording a dot on the recording medium. This makes it possible to suppress occurrence of a raster line in which no dot with the OC ink is formed on the printing medium P. Thus, it is possible to suppress occurrence of lines having varied density in the recording result.

(2) In the recording device according to the aspect described above, the first overcoat dither mask may have a blue noise property.

With the recording device according to this aspect, the first overcoat dither mask has a blue noise property, which makes it possible to record a printed image with favorable quality.

(3) In the recording device according to the aspect described above, at the time of generating dot data used to perform recording in accordance with the second recording mode in which a nozzle that discharges the overcoat ink is assigned to all the pixels in the recording target region of the recording medium, the second recording mode being a recording mode using the second nozzle row, the dot-data generating unit may generate the dot data using the second overcoat dither mask differing from the first overcoat dither mask.

With the recording device according to this aspect, at the time of generating dot data used to perform recording in accordance with the second recording mode in which a nozzle that discharges the overcoat ink using the second nozzle row is assigned to all the pixels in the recording target region, the dot-data generating unit generates the dot data using the second overcoat dither mask. This makes it possible to form a dot with the overcoat ink on a given pixel in the recording target region while increasing the dispersibility of dots with the overcoat ink.

It is possible to achieve the present disclosure with various aspects. For example, it is possible to achieve the present disclosure in a form of a printing apparatus, a printing method, a recording device, a recording method, an image processing method, a computer program that achieves these devices and methods, a recording medium that records such a computer program, or the like.

What is claimed is:

1. A recording device comprising:
a head including:
a plurality of first nozzle rows configured to discharge a plurality of drawing inks, respectively, each of the first nozzle rows having a plurality of nozzles; and
a second nozzle row configured to discharge an overcoat ink posterior to the drawing inks, the second nozzle row having a plurality of nozzles that is less than the number of the nozzles of each of the first nozzle rows; and
a processor configured to perform dot-data generating processing including halftone processing using a dither mask to generate dot data indicating presence or absence of formation of a dot on a recording medium, wherein
when generating dot data used to perform recording in accordance with a first recording mode which is a recording mode using the second nozzle row and in which no nozzle that discharges the overcoat ink is assigned to part of pixels in a recording target region of the recording medium and a dot of the overcoat ink is not formable on the part of pixels in the recording target region of the recording medium using the second nozzle row, the processor generates the dot data by using a first overcoat dither mask having a threshold value set so that a dot of the overcoat ink is not formed on the part of pixels in the recording target region of the recording medium.

2. The recording device according to claim 1, wherein the first overcoat dither mask has a blue noise property.

3. A method of recording a dot on a recording medium by a recording apparatus including a head including a plurality of first nozzle rows configured to discharge a plurality of drawing inks, respectively, with each of the first nozzle rows having a plurality of nozzles, and a second nozzle row configured to discharge an overcoat ink posterior to the drawing inks, with the second nozzle row having a plurality of nozzles that is less than the number of the nozzles of each of the first nozzle rows, the method comprising:
performing dot-data generating processing including halftone processing using a dither mask to generate dot data indicating presence or absence of formation of a dot on the recording medium, wherein
the performing of the dot-data generating process includes generating the dot data by using a first overcoat dither mask having a threshold value set so that a dot of the overcoat ink is not formed on part of pixels in a recording target region of the recording medium when generating dot data used to perform recording in accordance with a first recording mode which is a recording mode using the second nozzle row and in which no nozzle that discharges the overcoat ink is assigned to the part of pixels in the recording target region of the recording medium and a dot of the overcoat ink is not formable on the part of pixels in the recording target region of the recording medium using the second nozzle row.

* * * * *